(12) United States Patent
Jukoff (10) Patent No.: US 6,315,016 B1
(45) Date of Patent: Nov. 13, 2001

(54) COMBINATION WORKPIECE POSITIONING/HOLD-DOWN AND ANTI-KICKBACK DEVICE FOR A WORK TABLE

(76) Inventor: Peter Jukoff, 84-04 108th St., Richmond Hill, NY (US) 11418-1217

(*) Notice: Subject to any disclaimer, the term of this patent is extended or adjusted under 35 U.S.C. 154(b) by 0 days.

(21) Appl. No.: 09/482,772

(22) Filed: Jan. 13, 2000

Related U.S. Application Data
(60) Provisional application No. 60/115,932, filed on Jan. 14, 1999.

(51) Int. Cl.[7] .................................................. B27B 31/00
(52) U.S. Cl. ........................................................ 144/253.6
(58) Field of Search ............................ 144/134.1, 135.2, 144/253.1, 253.2, 253.5, 253.6

(56) References Cited

U.S. PATENT DOCUMENTS

| | | | |
|---|---|---|---|
| 481,983 | * | 9/1892 | Thom ................................ 144/253.6 |
| 1,022,176 | * | 4/1912 | Boothby ............................ 144/253.6 |
| 1,316,051 | * | 9/1919 | Linderman ........................ 144/253.6 |
| 5,301,726 | * | 4/1994 | Wojeik .............................. 144/253.6 |

* cited by examiner

Primary Examiner—W Donald Bray (74) Attorney, Agent, or Firm—Frishauf, Holtz, Goodman, Langer & Chick, P.C.

(57) ABSTRACT

A combination workpiece positioning, hold-down and anti-kickback device for a work table having a fence against which a workpiece is guided, includes a positioning member having an arcuate cam surface at one edge for engaging a side surface of a workpiece on the work table; an adjustment device for moving the positioning member in lengthwise and transverse directions relative to the workpiece and for locking the same thereat; a pivot pivotally mounting the positioning member to the adjustment device; a spring connected between the positioning member and the adjustment device for biasing the positioning member in a pivot direction into engagement with the side surface of the workpiece; a variable tensioning device for variably adjusting the biasing force of the spring; a hold-down member having a second arcuate cam surface at one edge for engaging an upper surface of the workpiece; an adjustment device for moving the hold-down member in lengthwise and vertical directions relative to the workpiece, and for locking the same thereat; a pivot pivotally mounting the hold-down member to the second adjustment device; a second spring connected between the hold-down member and the adjustment device for biasing the hold-down member in a second pivot direction into engagement with the upper surface of the workpiece; and a second variable tensioning device for variably adjusting the biasing force of the second spring.

21 Claims, 7 Drawing Sheets

COMBINATION WORKPIECE POSITIONING/HOLD-DOWN AND ANTI-KICKBACK DEVICE FOR A WORK TABLE

CROSS-REFERENCE TO RELATED APPLICATION

This application claims the benefit of Provisional Application Ser. No. 60/115,932, filed Jan. 14, 1999, the priority of which is claimed, and the entire contents of which are incorporated herein by reference.

BACKGROUND OF THE INVENTION

The present invention relates generally to work tables for power tools and the like, and more particularly, is directed to a combination workpiece positioning/hold-down and anti-kickback device for a work table.

A work table for a woodworking device, such as a power saw, router and the like, generally includes a horizontal tabletop on which the workpiece is supported and a fence secured to the tabletop and extending in the direction of movement of the workpiece. The workpiece is moved on the upper surface of the tabletop and is guided along the fence, during a cutting or other woodworking action.

Featherboard and other devices are known for pressing the workpiece against the fence during such movement, and various hold-down devices are known for pressing the upper surface of the workpiece to hold the workpiece down on the tabletop. Some of these devices have some of the following desirable features.

One such feature is the ability to prevent kick-back of the workpiece during a woodworking operation. Another feature is the adjustment of the positioning or hold-down member in lengthwise, transverse and vertical directions relative to the workpiece. Still another feature is the ability to variably adjust the biasing force of the positioning or hold-down member against the workpiece. However, the applicant is not aware of any devices that include all of these features in a simple arrangement.

SUMMARY OF THE INVENTION

Accordingly, it is an object of the present invention to provide a combination workpiece positioning/hold-down and anti-kickback device that overcomes the aforementioned disadvantages.

It is another object of the present invention to provide a combination workpiece positioning/hold-down and anti-kickback device that presses the side and/or top surface of the workpiece, while preventing kick-back thereof.

It is still another object of the present invention to provide a combination workpiece positioning/hold-down and anti-kickback device in which the positioning or hold-down member is adjustable in lengthwise, transverse and vertical directions relative to the workpiece.

It is yet another object of the present invention to provide a combination workpiece positioning/hold-down and anti-kickback device in which the biasing force of the positioning or hold-down member against the workpiece is variably adjustable.

In accordance with an aspect of the present invention, a combination workpiece positioning and anti-kickback device for a work table having a fence against which a workpiece is guided, includes a positioning member having a main body, and an arcuate cam surface at one edge of the main body for engaging a side surface of a workpiece on the work table; an adjustment device for moving the positioning member relative to the workpiece, the adjustment device including a lengthwise adjustment assembly movable in a lengthwise direction of movement of the workpiece along the work table for adjusting the position of the positioning member in the lengthwise direction, and a transverse adjustment assembly movable in a direction transverse to the lengthwise direction for adjusting the position of the positioning member in the transverse direction, the transverse adjustment assembly being movably connected to the lengthwise adjustment assembly; a lengthwise releasable locking device for releasably locking the lengthwise adjustment assembly relative to the work table at a desired location in the lengthwise direction; a transverse releasable locking device for releasably locking the transverse adjustment assembly relative to the work table at a desired location in the transverse direction; a pivot which pivotally mounts the positioning member to the adjustment device for pivoting movement; a spring connected between the positioning member and the adjustment device for biasing the positioning member with a biasing force in a first pivot direction about the pivot such that the arcuate cam surface is biased in a direction opposite to a feed direction of the workpiece and into engagement with the side surface of the workpiece; and a variable tensioning device for variably adjusting the biasing force of the spring.

The main body is oriented substantially in the transverse direction, and the arcuate cam surface has a curvature with an increasing radius in a direction opposite to the direction of movement of the workpiece along the work table such that smaller radius portions of the arcuate cam surface extend closer toward the workpiece than larger radius portions of the arcuate cam surface. Preferably, the main body has an oblong shape.

The lengthwise adjustment assembly includes a first guide track extending in the lengthwise direction, and a guide rail movable in the guide track in the lengthwise direction, the pivot pivotally mounting the positioning member to the guide rail for pivoting movement. In addition, the lengthwise adjustment assembly includes a second guide track extending in the lengthwise direction, the second guide track being collinear with the first guide track with a gap between the first and second guide tracks in which the positioning member is located.

The lengthwise releasable locking device includes a releasable clamping device for releasably clamping the guide rail to the first and second guide tracks at a desired location therealong. In this regard, each of the first and second guide tracks and the guide rail include teeth such that the teeth of the guide rail engage the teeth of the first and second guide tracks to prevent relative movement therebetween when the releasable clamping device releasably clamps the guide rail to the first and second guide tracks at a desired location therealong. Further, each guide track includes at least one lengthwise groove therein, and the guide rail includes at least one lengthwise rod which slidably extends within each groove to prevent transverse movement of the guide rail relative to the guide tracks.

The transverse adjustment assembly includes a first abutment secured to the first guide track for engaging one transverse side of the work table; and a second abutment for engaging an opposite transverse side of the work table. The transverse releasable locking device includes a releasable clamp secured to the second guide track and the second abutment for moving the second abutment into releasable engagement with the opposite side of the work table; and a threaded rod which connects the second abutment to the releasable clamp with an adjustable distance therebetween.

There is further provided a stop on the lengthwise adjustment assembly for limiting pivotal movement of the positioning member.

The variable tensioning device includes a threaded tensioning rod connected between the spring and the lengthwise adjusting assembly, and threadedly connected with the lengthwise adjustment assembly for variably changing the biasing force of the spring.

In accordance with another aspect of the present invention, a combination workpiece hold-down and anti-kickback device for a work table having a fence against which a workpiece is guided, includes a hold-down member having a main body, and an arcuate cam surface at one edge of the main body for engaging an upper surface of a workpiece on the work table; an adjustment device for moving the hold-down member relative to the workpiece, the adjustment device including a lengthwise adjustment assembly movable in a lengthwise direction of movement of the workpiece along the work table for adjusting the position of the hold-down member in the lengthwise direction, and a vertical adjustment assembly movable in a vertical direction transverse to the lengthwise direction for adjusting the position of the hold-down member in the vertical direction, the vertical adjustment assembly being movably connected to the lengthwise adjustment assembly; a lengthwise releasable locking device for releasably locking the lengthwise adjustment assembly relative to the work table at a desired location in the lengthwise direction; a vertical releasable locking device for releasably locking the vertical adjustment assembly relative to the work table at a desired location in the vertical direction; a pivot which pivotally mounts the hold-down member to the adjustment device for pivoting movement; a spring connected between the hold-down member and the adjustment device for biasing the hold-down member with a biasing force in a first pivot direction about the pivot such that the arcuate cam surface is biased in a direction opposite to a feed direction of the workpiece and into engagement with the upper surface of the workpiece; and a variable tensioning device for variably adjusting the biasing force of the spring.

The main body is oriented substantially in the vertical direction, and the arcuate cam surface has a curvature with an increasing radius in a direction opposite to the direction of movement of the workpiece along the work table such that smaller radius portions of the arcuate cam surface extend closer toward the workpiece than larger radius portions of the arcuate cam surface. Preferably, the main body has an oblong shape.

The lengthwise adjustment assembly includes a guide track extending in the lengthwise direction, and a guide rail movable in the guide track in the lengthwise direction, with the vertical adjustment assembly mounted to the guide rail. The lengthwise releasable locking device includes a releasable clamping device for releasably clamping the guide rail to the guide track at a desired location therealong.

The vertical adjustment assembly includes at least one vertically oriented rod extending from the guide rail; and a guide block movably mounted along the at least one vertically oriented rod, the pivot pivotally mounting the hold-down member to the guide block for pivoting movement. The vertical releasable locking device includes a releasable clamp secured to the guide block for releasably engaging the at least one vertically oriented rod.

There is also provided a stop on the vertical adjustment assembly for limiting pivotal movement of the hold-down member.

The variable tensioning device includes a threaded tensioning rod connected between the spring and the vertical adjusting assembly, and threadedly connected with the vertical adjustment assembly for variably changing the biasing force of the spring.

In accordance with still another aspect of the present invention, a combination workpiece positioning, hold-down and anti-kickback device for a work table having a fence against which a workpiece is guided, includes a first positioning member having a main body, and a first arcuate cam surface at one edge of the main body for engaging a side surface of a workpiece on the work table; a first adjustment device for moving the first positioning member relative to the workpiece, the adjustment device including a first lengthwise adjustment assembly movable in a lengthwise direction of movement of the workpiece along the work table for adjusting the position of the positioning member in the lengthwise direction, and a first transverse adjustment assembly movable in a direction transverse to the lengthwise direction for adjusting the position of the positioning member in the transverse direction, the transverse adjustment assembly being movably connected to the lengthwise adjustment assembly; a first lengthwise releasable locking device for releasably locking the lengthwise adjustment assembly relative to the work table at a desired location in the lengthwise direction; a first transverse releasable locking device for releasably locking the transverse adjustment assembly relative to the work table at a desired location in the transverse direction; a first pivot which pivotally mounts the positioning member to the adjustment device for pivoting movement; a first spring connected between the positioning member and the adjustment device for biasing the positioning member with a biasing force in a first pivot direction about the pivot such that the arcuate cam surface is biased in a direction opposite to a feed direction of the workpiece into engagement with the side surface of the workpiece; a first variable tensioning device for variably adjusting the biasing force of the spring; a hold-down member having a main body, and a second arcuate cam surface at one edge of the main body for engaging an upper surface of a workpiece on the work table; a second adjustment device for moving the hold-down member relative to the workpiece, the second adjustment device including a second lengthwise adjustment assembly movable in the lengthwise direction for adjusting the position of the hold-down member in the lengthwise direction, and a vertical adjustment assembly movable in a vertical direction transverse to the lengthwise direction for adjusting the position of the hold-down member in the vertical direction, the vertical adjustment assembly being movably connected to the lengthwise adjustment assembly; a second lengthwise releasable locking device for releasably locking the second lengthwise adjustment assembly relative to the work table at a desired location in the lengthwise direction; a vertical releasable locking device for releasably locking the vertical adjustment assembly relative to the work table at a desired location in the vertical direction; a second pivot which pivotally mounts the hold-down member to the second adjustment device for pivoting movement; a second spring connected between the hold-down member and the second adjustment device for biasing the hold-down member with a biasing force in a second pivot direction about the second pivot such that the second arcuate cam surface is biased in a direction opposite to the feed direction of the workpiece and into engagement with the upper surface of the workpiece; and a second variable tensioning device for variably adjusting the biasing force of the second spring.

The above and other objects, features and advantages of the invention will become readily apparent from the following detailed description thereof which is to be read in connection with the accompanying drawings.

DETAILED DESCRIPTION

Referring to the drawings in detail, a combination workpiece positioning/hold-down and anti-kickback device 10 according to the present invention is designed for a use with a work table 12 having a tabletop 14 with an upper surface 16 and opposite transverse sides 18 and 20. As is conventional, a fence 22 is secured at one edge of work table 12. During operation, a workpiece 24, such as a piece of wood, is positioned on upper surface 16 and against fence 22. Then, a woodworking operation is performed by a woodworking tool such as a saw, router 26 and the like, while workpiece 24 is moved in the lengthwise direction 27 of work table 12, against fence 22.

In order to press workpiece 24 against fence 22, combination workpiece positioning/hold-down and anti-kickback device 10 includes a positioning member 28 having a main body 30 with a generally oblong shape, and an arcuate cam surface 32 at one shorter edge of main body 30 for engaging a side surface of workpiece 24 on work table 12. Positioning member 28 can be made of a plastic material, a Teflon (trademark) like material, or the like. In accordance with the present invention, as will be described in more detail below, main body 30 is oriented substantially in a direction 34 transverse to lengthwise direction 27. Further, arcuate cam surface 32 has a curvature with an increasing radius in a direction opposite to the direction 27 of movement of workpiece 24 along work table 12 such that smaller radius portions 32a of arcuate cam surface 32 extend closer toward workpiece 24 than larger radius portions 32b of arcuate cam surface 32. This means that, as positioning member 28 is pivoted about a fixed pivot pin, as will be described hereinafter, engagement with smaller radius portions 32a provides a stronger biasing action.

A pivot pin 36 which is fixed to main body 30 at a side opposite from arcuate cam surface 32, is pivotally mounted to an adjustment device 38 for moving positioning member 28 relative to workpiece 24. Specifically, adjustment device 38 includes a lengthwise adjustment assembly 40 movable in lengthwise direction 27 for adjusting the position of positioning member 28 in lengthwise direction 27, and a transverse adjustment assembly 42 movable in transverse direction 34 for adjusting the position of positioning member 28 in transverse direction 34, with transverse adjustment assembly 42 being movably connected to lengthwise adjustment assembly 40.

Lengthwise adjustment assembly 40 includes a first guide track 44 extending in lengthwise direction 27 and a second guide track 46 extending in lengthwise direction 27, second guide track 46 being collinear with first guide track 44, with a gap 48 between first and second guide tracks 44 and 46. Positioning member 28 is located in gap 48. Each guide track 44 and 46 includes two spaced apart and parallel grooves 50 and 52 therein, the purpose for which will become apparent from the discussion hereinafter. Further, side plates 54 are secured to sides of guide tracks 44 and 46 at adjacent ends of guide tracks 44 and 46, with upper edges of side plates 54 having short locking teeth 56 thereon.

Lengthwise adjustment assembly 40 further includes a guide rail 58 mounted on top of guide tracks 44 and 46 and interconnecting guide tracks 44 and 46. In this regard, guide rail 58 lies above gap 48, with pivot pin 36 being pivotally mounted in a recess 60 at the underside of guide rail 58. In addition, guide rail 58 includes a downwardly extending stop pin 62 which limits the angular pivoting range of positioning member 28.

Guide rail 58 includes two spaced apart and parallel, lengthwise extending rods 64 and 66 secured to an underside thereof by countersunk screws 67 (FIG. 8), and which slidably extend within grooves 50 and 52, respectively, to prevent transverse movement of guide rail 58 relative to guide tracks 44 and 46.

Further, guide rail 58 includes side plates 68 at opposite ends thereof, each having locking teeth 70 at the lower edge thereof which engage with locking teeth 56 of side plates 54 of first and second guide tracks 44 and 46, to prevent relative lengthwise movement therebetween when guide rail 58 is clamped to guide tracks 44 and 46, as will be described hereinafter.

In order to provide such clamping operation, a lengthwise releasable locking device 72 is provided, which effectively releasably locks lengthwise adjustment assembly 40 relative to work table 12 at a desired location in lengthwise direction 27. Specifically, lengthwise releasable locking device 72 includes two releasable clamping devices 74 for releasably clamping guide rail 58 to first and second guide tracks 44 and 46 at a desired location therealong.

Figure 8:
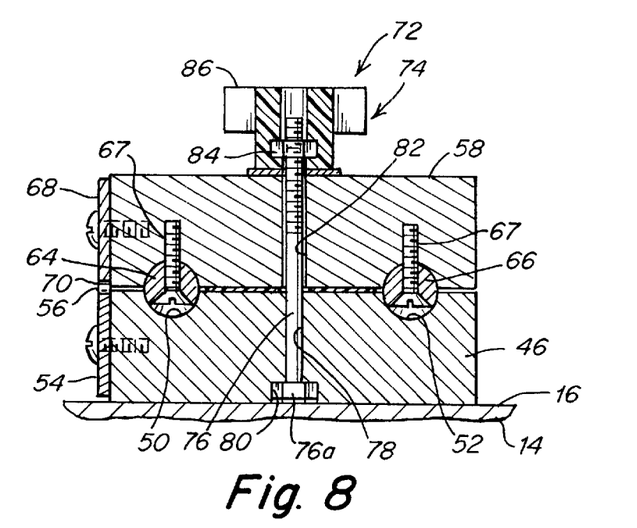
FIG. 8 is a cross-sectional view of the combination workpiece positioning/hold-down and anti-kickback device, taken along line 8—8 of FIG. 7.
Figure 9:
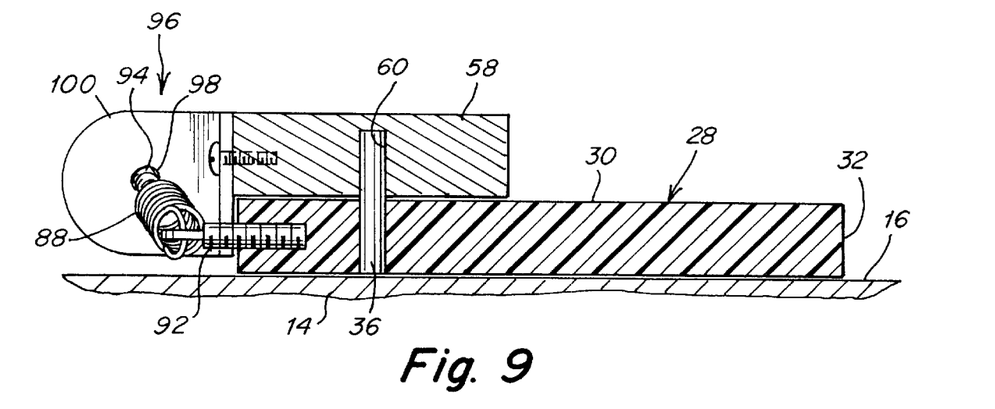
FIG. 9 is a cross-sectional view of the combination workpiece positioning/hold-down and anti-kickback device, taken along line 9—9 of FIG. 7.

As best shown in FIG. 8, each releasable clamping device 74 includes a bolt 76 extending through a vertically oriented hole 78 in each guide track 44 and 46. The lower end of hole 78 can have a hexagonal recess 80 therein for receiving the hexagonal bolt head 76a. Guide rail 58 includes two aligned through slots 82 at opposite ends thereof, each through slot 82 extending in lengthwise direction 27. Each bolt 76 thereby extends through hole 78 and a respective through slot 82, and then to a position above guide rail 58, where it threadedly receives a nut 84 thereon. A clamping head 86 is secured to nut 84.

Thus, as clamping head 86 is rotated, nut 84 is caused to rotate, whereby clamping head 86 moves down in order to press guide rail 58 onto guide tracks 44 and 46, and thereby releasably lock guide rail 58 to guide tracks 44 and 46. In such condition, guide rail 58 and guide tracks 44 and 46 form a unitary assembly.

With this arrangement, assuming that guide tracks 44 and 46 are fixed in position, as will be discussed hereinafter, guide rail 58 can move in lengthwise direction 27. Since positioning member 28 is pivotally mounted to guide rail 58, positioning member 28 is also moved in lengthwise direction 27 for adjusting the position thereof.

A coil spring 88 is connected between positioning member 28 and adjustment device 38 for biasing positioning member 28 with a biasing force in a first pivot direction 90 about pivot pin 36 such that arcuate cam surface 32 is biased in a direction opposite to feed direction 27 of workpiece 24 and into engagement with the side surface of workpiece 24.

In this regard, an eyelet 92 is secured to the side edge of positioning member 28 which is opposite arcuate cam surface 32, with one end of spring 88 secured to eyelet 92. The opposite end of spring 88 is secured to a threaded rod 94 which forms part of a variable tensioning device 96 for variably adjusting the biasing force of spring 88. Rod 94 extends through an opening 98 in an L-shaped bracket 100 which is secured to the side edge of guide rail 58, and a wing nut 102 is threaded to the end of rod 94 extending out through opening 98. As a result, positioning member 28 is pivoted in pivot direction 90 about pivot pin 36 with a biasing force which is variably adjustable by tightening or loosening wing nut 102.

In order to move positioning member 28 in transverse direction 34, that is, closer to or farther away from workpiece 24, adjustment device 38 includes transverse adjustment assembly 42 which is movable in transverse direction 34. Transverse adjustment assembly 42 includes a first abutment 104 in the form of an L-shaped bracket fixed to the lower surface of first guide track 44 for engaging one transverse side 18 of work table 12 and a second abutment 116 for engaging the opposite transverse side 20 of work table 12.

In order to lock first and second abutments 104 and 116 against work table 12, and thereby releasably lock positioning member 28 in a desired transverse position, a transverse release locking device 105 includes an overcenter clamp 106 fixed to the lower surface of second guide track 46, with overcenter clamp 106 having a handle 108 pivotally secured to a linkage 110 that is slidably mounted to the lower surface of second guide track 46 by a holder 112. A threaded rod 114 is threadedly secured to the end of linkage 110, and second abutment 116 is secured to the opposite end of threaded rod 114.

With this arrangement, threaded rod 114 is turned so as to move second abutment 116 closer to or farther away from handle 108 in lengthwise direction 27. This is performed until abutments 104 and 116 loosely abut against transverse sides 18 and 20 of work table 12. Then, handle 108 is pivoted to a closed position, thereby moving threaded rod 114 away from it, whereby first and second abutments 104 and 116 tightly engage tabletop 14. In this manner, positioning member 28 can be moved toward or away from workpiece 24, and be secured in a desired transverse position.

In operation, the position of positioning member 28 in lengthwise direction 27 is first adjusted by lengthwise adjustment assembly 40. Thereafter, the position of positioning member 28 in transverse direction 34 is adjusted by transverse adjustment assembly 42. Wing nut 102 is then rotated to adjust the spring biasing force.

When workpiece 24 is moved in feed direction 27, for example, for a router operation, spring 88 rotates arcuate cam surface 32 of positioning member 28 into engagement with the side of workpiece 24 with a light spring tension. Thus, workpiece 24 is pushed against fence 22 to obtain exact positioning of workpiece 24. It is to be pointed out that the material of positioning member 28 and the spring force on positioning member 28 do not damage workpiece 24, even if workpiece 24 is made from a soft wood material, such as pine.

As workpiece 24 is moved in the feed direction 27, there may be a tendency for router 26 to impart a force to workpiece 24 which tends to push it in a direction away from fence 22, that is, to provide a kick-back. With the present invention, however, this results in positioning member 28 being rotated further in pivot direction 90. As a result, because of the curvature of arcuate cam surface 32, there is a stronger force applied to workpiece 24, which acts against such kick-back in order to prevent or minimize the same. This occurs even through positioning member 28 is made of a plastic material, a Teflon (trademark) like material, or the like, and may be somewhat slippery.

In order to press workpiece 24 down from above, combination workpiece positioning/hold-down and anti-kickback device 10 includes a hold-down member 128 having a main body 130 with a generally oblong shape, and an arcuate cam surface 132 at one shorter edge of main body 130 for engaging an upper surface of workpiece 24 on work table 12. Hold-down member 128 can be made of a plastic material, a Teflon (trademark) like material, or the like. In accordance with the present invention, as will be described in more detail below, main body 130 is oriented substantially in a vertical direction 134 transverse to lengthwise direction 27. Further, arcuate cam surface 132 has a curvature with an increasing radius in a direction opposite to the direction 27 of movement of workpiece 24 along work table 12 such that smaller radius portions 132a of arcuate cam surface 132 extend closer toward workpiece 24 than larger radius portions of arcuate cam surface 132.

A pivot pin 136 which is fixed to main body 130 at a side opposite from arcuate cam surface 132, is pivotally mounted to an adjustment device 138 for moving hold-down member 128 relative to workpiece 24. Specifically, adjustment device 138 includes a lengthwise adjustment assembly 140 movable in lengthwise direction 27 for adjusting the position of hold-down member 128 in lengthwise direction 27, and a vertical adjustment assembly 142 movable in vertical direction 134 for adjusting the position of hold-down member 128 in vertical direction 134, with vertical adjustment assembly 142 being movably connected to lengthwise adjustment assembly 140.

Lengthwise adjustment assembly 140 includes a guide track 144 extending in lengthwise direction 27. Guide track 144 is formed by a generally tubular member 145 of a square cross-section and having a slot 147 running the length at the upper surface thereof. Lengthwise adjustment assembly 140 further includes a guide rail 158 slidably mounted on top of guide track 144.

In order to provide such sliding movement and to also provide a clamping operation, a lengthwise releasable locking device 172 is provided, which effectively releasably locks lengthwise adjustment assembly 140 relative to work table 12 at a desired location in lengthwise direction 27. Specifically, lengthwise releasable locking device 172 includes a releasable clamping device 174 for releasably clamping guide rail 158 to guide track 144 at a desired location therealong.

Figure 2:
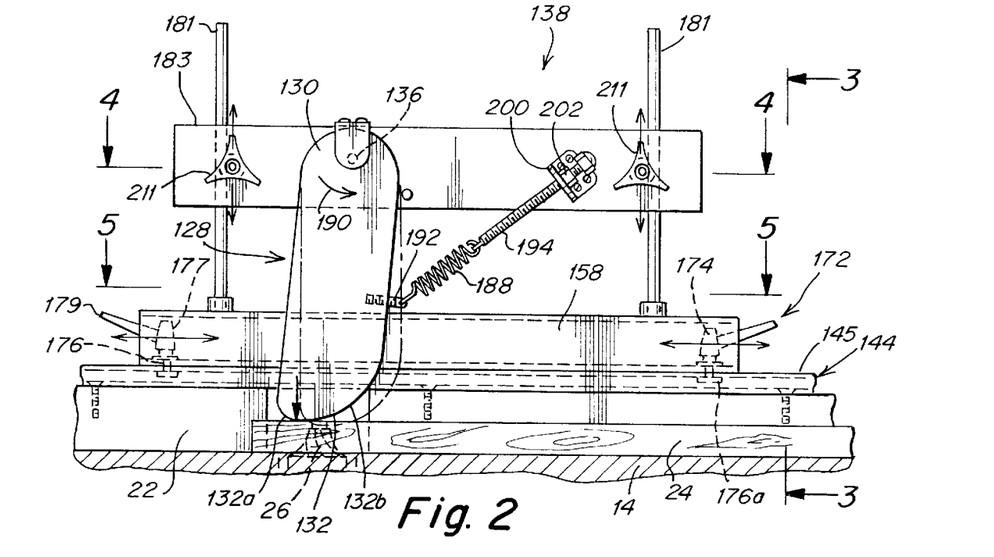
FIG. 2 is a front elevational view, partly in section, of the combination workpiece positioning/hold-down and anti-kickback device, as viewed along line 2—2 of FIG. 1.
Figure 3:
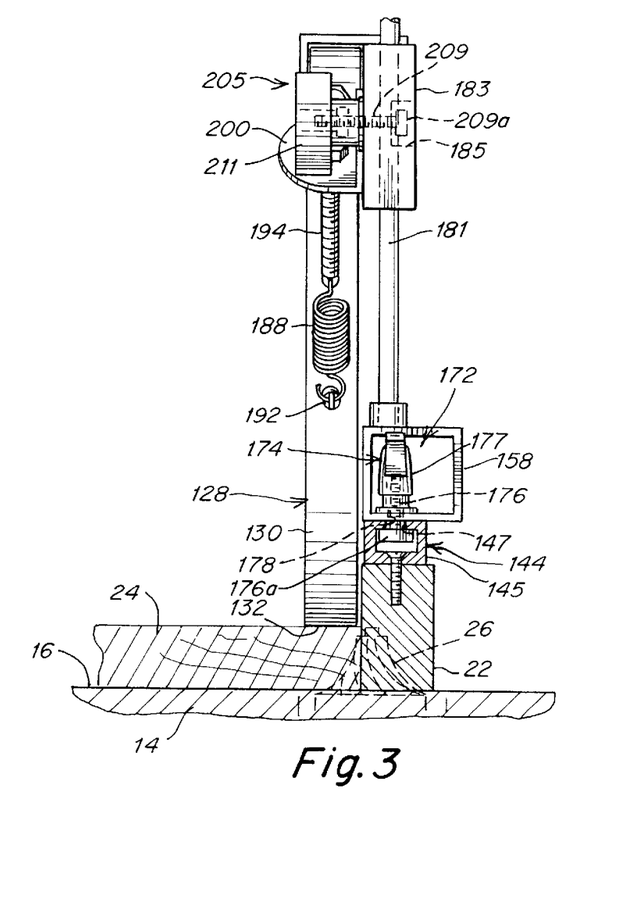
FIG. 3 is an end elevational view, partly in section, of the combination workpiece positioning/hold-down and anti-kickback device, as viewed along line 3—3 of FIG. 2.

As best shown in FIG. 3, releasable clamping device 174 includes a bolt 176 extending through slot 147 and a hole 178 in guide rail 158, with bolt head 176a being received in guide rail 144. The opposite end of bolt 176 extends into guide rail 158 where it is engaged with a clamp 177 having a rotatable handle 179 (shown in FIGS. 1, 2 and 5). When handle 179 is rotated in one direction, bolt 176 is pulled up, so that bolt head 176a engages with guide track 144 so as to releasably lock guide rail 158 to guide track 144. When handle 179 is rotated in the opposite direction, bolt 176 is lowered, thereby permitting sliding movement of guide rail 158 on guide track 144 to adjust the lengthwise position thereof.

In order to move hold-down member 128 in vertical direction 134, that is, closer to or farther away from workpiece 24, adjustment device 138 includes vertical adjustment assembly 142 which is movable in vertical direction 134. Vertical adjustment assembly 142 includes two vertically oriented rods 181 extending upwardly from guide rail 158 in parallel, spaced apart relation. A guide block 183 is slidably mounted along vertically oriented rods 181.

Figures 4, 5:
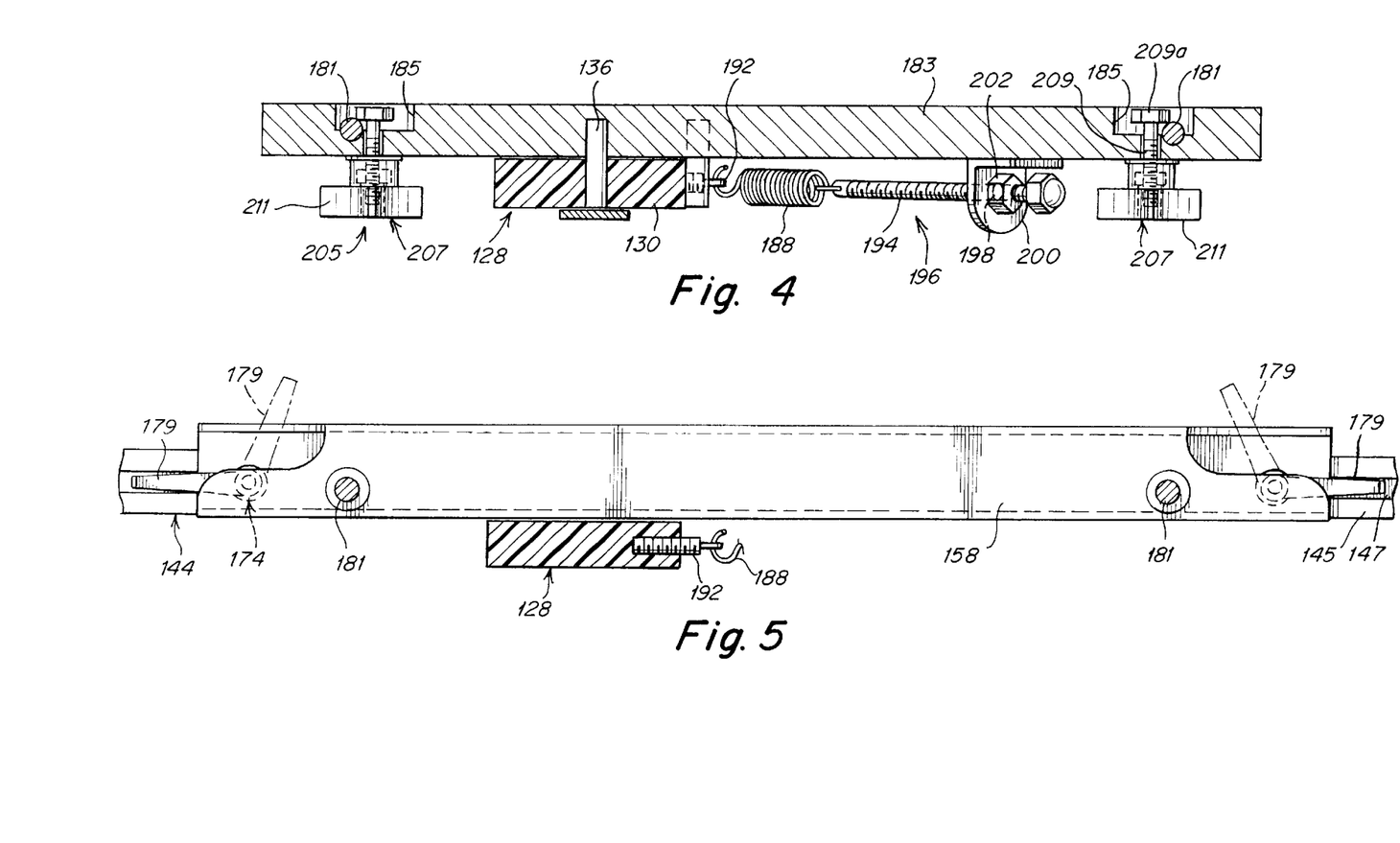
FIG. 4 is a cross-sectional view of the combination workpiece positioning/hold-down and anti-kickback device, taken along line 4—4 of FIG. 2.
FIG. 5 is a cross-sectional view of the combination workpiece positioning/hold-down and anti-kickback device, taken along line 5—5 of FIG. 2.
Figures 6, 7:
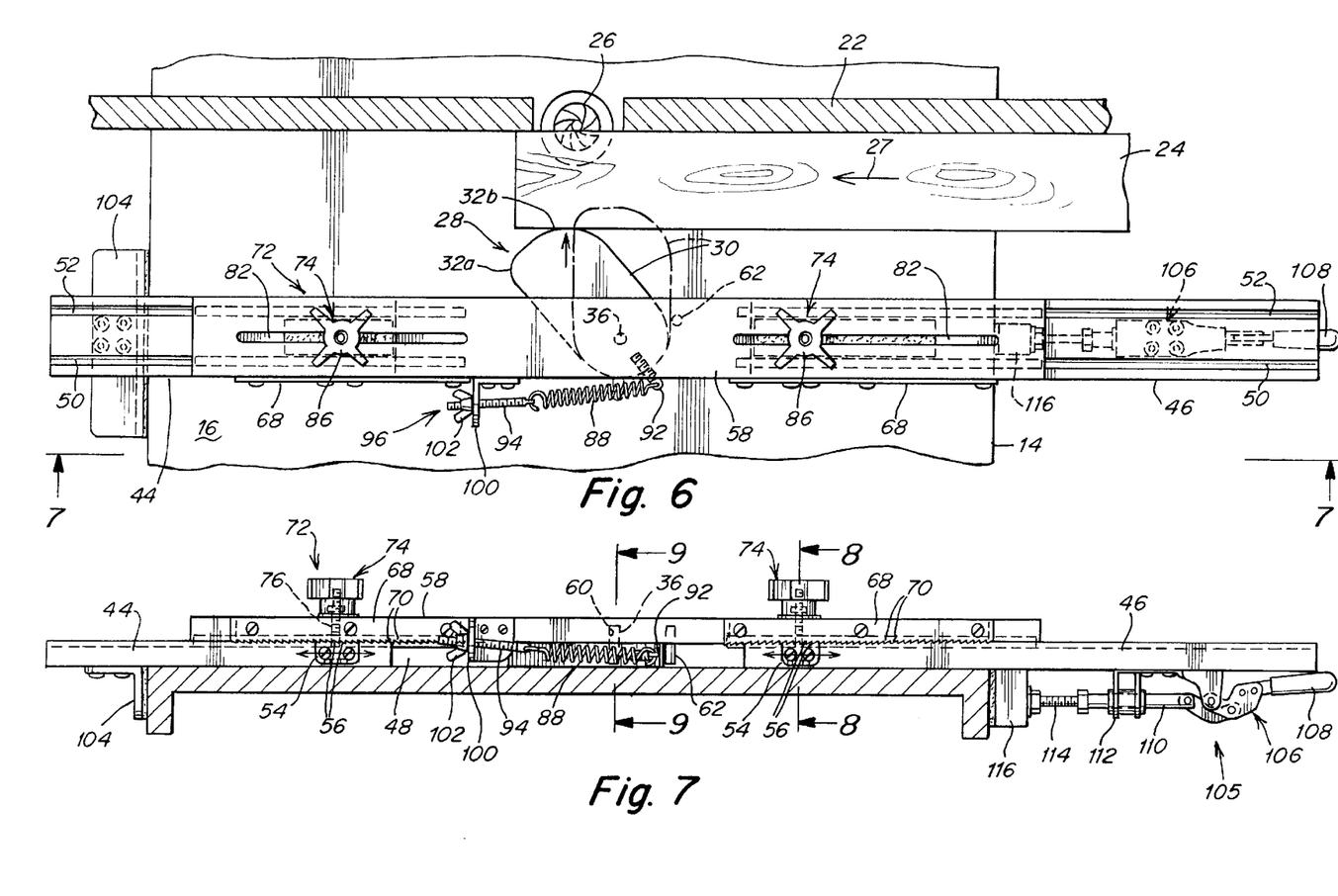
FIG. 6 is a top plan view, partly in section, of the combination workpiece positioning/hold-down and anti-kickback device, as viewed along line 6—6 of FIG. 1.
FIG. 7 is an end elevational view, partly in section, of the combination workpiece positioning/hold-down and anti-kickback device, as viewed along line 7—7 of FIG. 6.

As best shown in FIG. 4, guide block 183 has two T-shaped slots 185 extending in vertical direction 134. A vertical releasable locking device 205 includes a releasable clamp 207 secured to guide block 183 for releasably engaging vertically oriented rods 181. Specifically, a bolt 209 extends through each T-shaped slot 185 such that the respective rod 181 is captured in the T-shaped slot 185 between the bolt head 209a and guide block 183. A clamp head 211 threadedly receives the free end of bolt 209 extending through T-shaped slot 185. When clamp head 211 is tightened, bolt head 209a clamps the respective rod 181 against guide block 183 to releasably lock guide block 183 in a desired vertical position. When clamp head 211 is loosened, bolt head 209a no longer clamps the rod 181, so that guide block 183 is free to move along rods 181.

A coil spring 188 is connected between hold-down member 128 and adjustment device 138 for biasing hold-down member 128 with a biasing force in a first pivot direction 190 about pivot pin 136 such that arcuate cam surface 132 is biased in a direction opposite to feed direction 27 of workpiece 24 and into engagement with the upper surface of workpiece 24.

In this regard, an eyelet 192 is secured to a side edge of hold-down member 128 which is transverse to arcuate cam surface 132, with one end of spring 188 secured to eyelet 192. The opposite end of spring 188 is secured to a threaded rod 194 which forms part of a variable tensioning device 196 for variably adjusting the biasing force of spring 188. Rod 194 extends through an opening 198 in an L-shaped bracket 200 which is secured to guide block 183, and a nut 202 is threaded to the end of rod 194 extending out through opening 198. As a result, hold-down member 128 is pivoted in pivot direction 190 about pivot pin 136 with a biasing force which is variably adjustable by tightening or loosening nut 202.

In operation, the position of hold-down member 128 in lengthwise direction 27 is first adjusted by lengthwise adjustment assembly 140. Thereafter, the position of hold-down member 128 in vertical direction 134 is adjusted by vertical adjustment assembly 142. Nut 202 is then rotated to adjust the spring biasing force.

When workpiece 24 is moved in feed direction 27, for example, for a router operation, spring 188 rotates arcuate cam surface 132 of hold-down member 128 into engagement with the upper surface of workpiece 24 with a light spring tension. Thus, workpiece 24 is pushed down. It is to be pointed out that the material of hold-down member 128 and the spring force on hold-down member 128 do not damage workpiece 24, even if workpiece 24 is made from a soft wood material, such as pine.

As workpiece 24 is moved in the feed direction 27, there may be a tendency for router 26 to impart a force to workpiece 24 which tends to push it in a direction opposite the feed direction 27, that is, to provide a kick-back. With the present invention, however, this results in hold-down member 128 being rotated further in pivot direction 190. As a result, because of the curvature of arcuate cam surface 132, there is a stronger force applied to workpiece 24, which acts against such kick-back in order to prevent or minimize the same. This occurs even through hold-down member 128 is made of a plastic material, a Teflon (trademark) like material, or the like, and may be somewhat slippery.

Thus, in accordance with the present invention, the side and upper surface of workpiece 24 are held or biased, while preventing kick-back thereof. Further, positioning member 28 is adjustable in lengthwise and transverse directions relative to workpiece 24, while hold-down member 128 is adjustable in lengthwise and vertical directions relative to workpiece 24. In addition, the biasing force of the positioning or hold-down member against workpiece 24 is variably adjustable.

Figure 10:
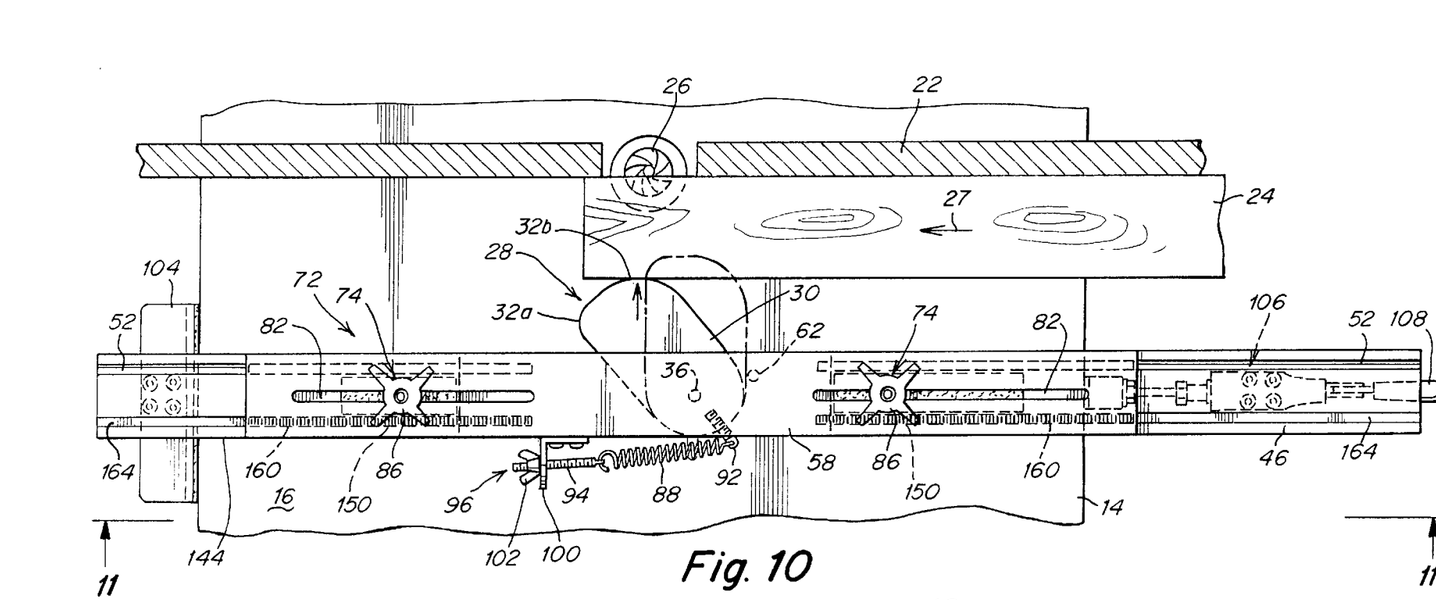
FIG. 10 is a top plan view, partly in section, of a modified embodiment wherein locking teeth 56, 70 are replaced with mutually engaging linear gear racks.
Figure 11:
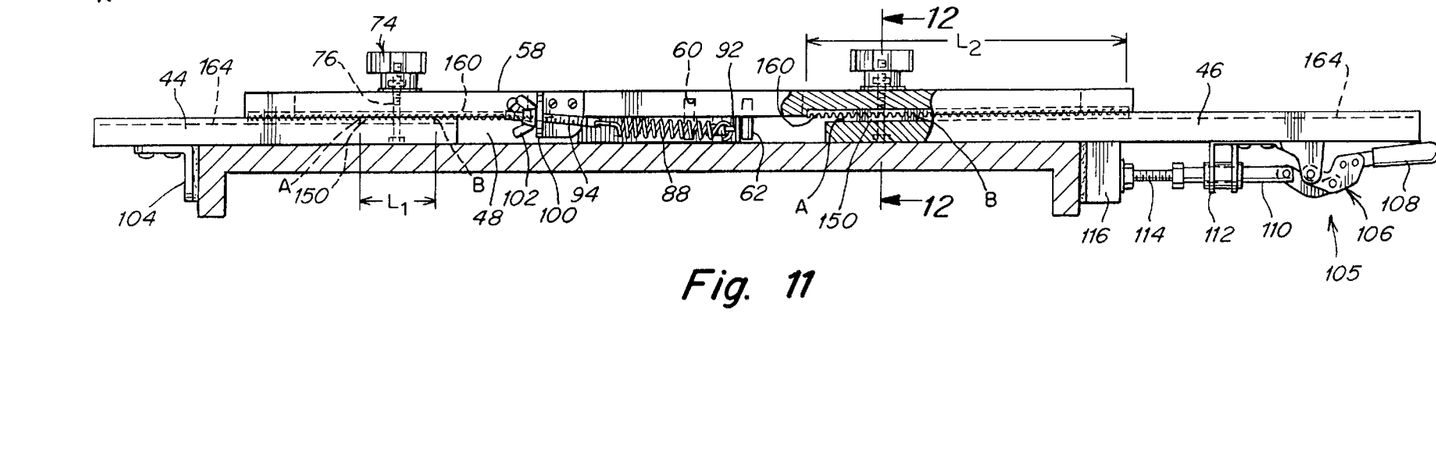
FIG. 11 is an end elevational view, partly in section, of the modified embodiment of FIG. 10.
Figure 12:
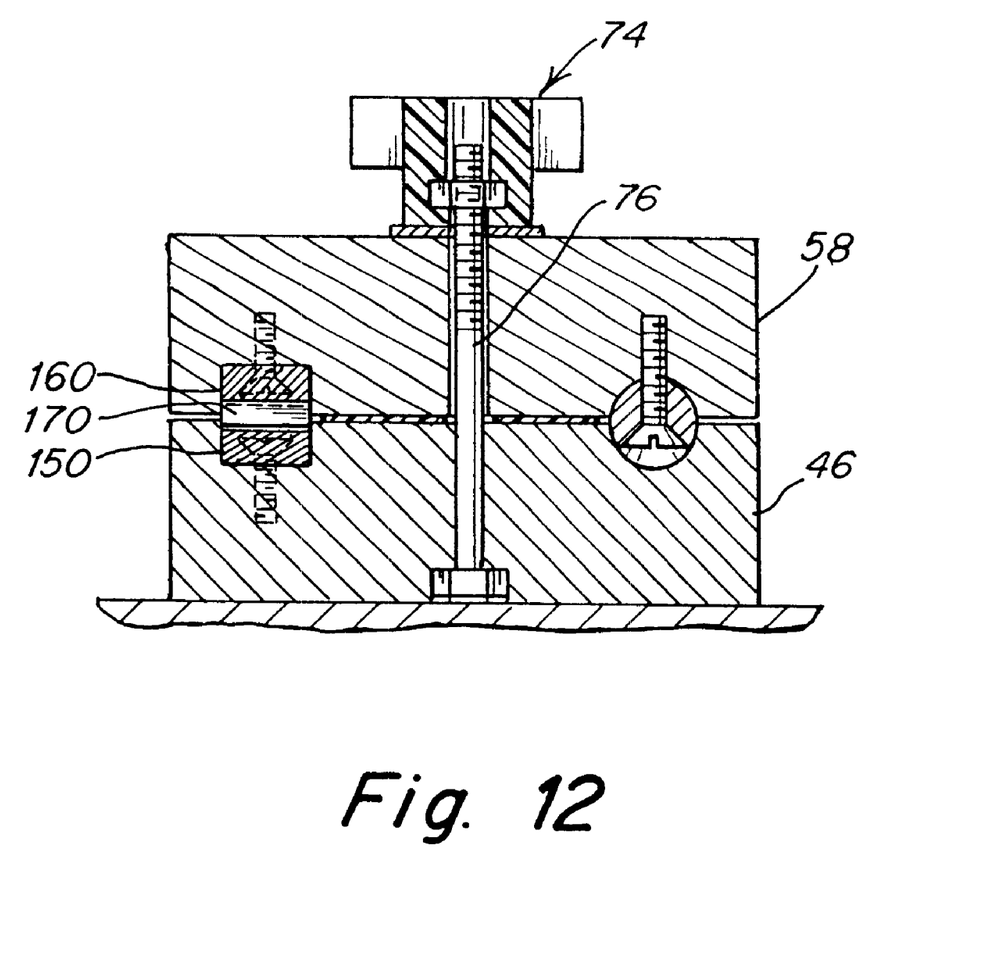
FIG. 12 is a cross-sectional view of the modified embodiment shown in FIGS. 10 and 11, taken along line 12—12 in FIG. 11.

FIGS. 10–12 illustrate a modified embodiment wherein the locking teeth 56, 70 and the side plates are eliminated so as to provide smooth mating (facing) surfaces for guide tracks 44, 46 and guide rail 58. Locking of the members 46, 58 relative to each other is achieved by providing a linear gear rack 150 in each of grooves 50 (of FIG. 1) of each of members 44, 46 and by providing a mating linear gear rack section 160 in the upper clamping part 58 which clamps against the lower gear rack 150. See FIG. 12.

Referring to FIGS. 10–12, the modified embodiment is explained in more detail. As shown in FIGS. 10 and 11, a linear gear rack, such as a spur gear rack manufactured by Boston Gear (part No. L505-4) having a pitch of 24 teeth per inch and a width of about ¼ inch is mounted in mounting groove 164 of each of members 44, 46. The linear gear rack 150 is stationary relative to the respective guide tracks 44, 46. A clamping member 74, which clamps upper guide rail 58 to lower guide rail 46 (see FIG. 12) is provided for tightening the clamping between the upper and lower guide rails 46, 58 and for mutually engaging the teeth of the lower gear rack 150 with the teeth of the upper gear rack 160. The area 170 in FIG. 12 shows the mutually engaged teeth of the upper and lower gear racks 160, 150, respectively. The clamping member 74 in FIG. 12 is similar to the clamping arrangement of FIG. 8, and a detailed description thereof is not given. To move the guide rails 58, 46 relative to each other, the clamping member 74 is loosened, the upper guide rail 58 is lifted so as to bring the teeth of the upper linear gear rack 160 out of engagement with the teeth of lower linear gear rack 150, so that the parts 46, 58 can be moved horizontally relative to each other. After proper location, the clamp member 74 is tightened so as to bring the teeth of the gear rack sections 150, 160 back into engagement with each other, thereby locking member 58 relative to member 46.

The linear gear rack sections 150, 160 are maintained in position by use of screws shown in FIG. 12. Other attachment could be used, such as nails rivets, adhesives, etc.

The reference numerals in FIGS. 10–12 which are the same as in FIGS. 1–9 represent the same or similar articles as in FIGS. 1–9.

As seen in FIG. 11, the lower rack section 150 extends horizontally only from point A to point B so as to have a length L, which is substantially shorter than the length of the upper linear gear rack section 160. It is not necessary for the lower linear gear rack section 150 to extend for the full length of the upper gear rack section 160. As seen in the right hand side of FIG. 11, the upper gear rack section has a length L2 which is much greater than length L1 of the lower gear rack section.

Figure 1:
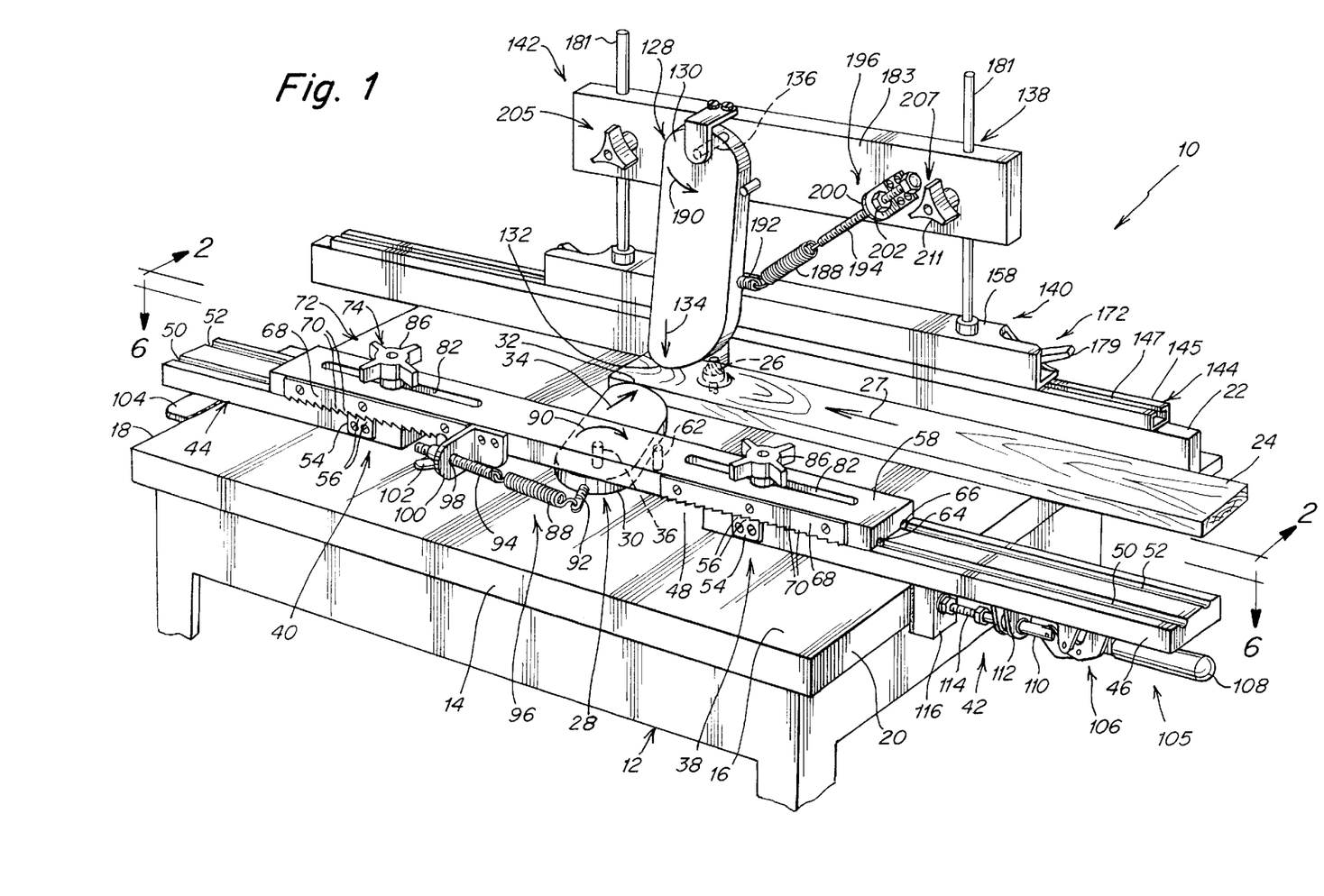
FIG. 1 is a perspective view of the combination workpiece positioning/hold-down and anti-kickback device according to the present invention.

As should be clear, the groove 50 shown in FIG. 1 is rounded, whereas the groove for accepting the lower gear rack section 150 is rectangular to accept the gear rack section. Similarly, the upper groove in member 58 is made rectangular so as to accept the upper gear rack section 160. A benefit of the modified arrangement of FIGS. 10–12 is that the locking mechanism is now internal and the user would be less likely to snag a sleeve or other clothing or otherwise contact exposed sawtooth sections, as is possible in the embodiment of FIGS. 1–9.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

| REFERENCE DESIGNATOR | |
|---|---|
| 10 | combination workpiece positioning/hold-down and anti-kickback device |
| 12 | work table |
| 14 | tabletop |
| 16 | upper surface |
| 18 | transverse side |
| 20 | transverse side |
| 22 | fence |
| 24 | workpiece |
| 26 | router |
| 27 | direction |
| 28 | non-rotatable positioning member |
| 30 | main body |
| 32 | arcuate cam surface |
| 32a | smaller radius portions |
| 32b | larger radius portions |
| 34 | transverse direction |
| 36 | pivot pin |
| 38 | adjustment device |
| 40 | lengthwise adjustment assembly |
| 42 | transverse adjustment assembly |
| 44 | first guide track |
| 46 | second guide track |
| 48 | gap |
| 50 | groove |
| 52 | groove |
| 54 | side plates |

| -continued | |
|---|---|
| REFERENCE DESIGNATOR | |
| 56 | short locking teeth |
| 58 | guide rail |
| 60 | recess |
| 62 | downwardly extending stop pin |
| 64 | lengthwise extending rod |
| 66 | lengthwise extending rod |
| 67 | countersunk screws |
| 68 | side plate |
| 70 | locking teeth |
| 72 | lengthwise releasable locking device |
| 74 | releasable clamping device |
| 76 | bolt |
| 76a | bolt head |
| 78 | vertically oriented hole |
| 80 | hexagonal recess |
| 82 | through slots |
| 84 | nut |
| 86 | clamping head |
| 88 | coil spring |
| 90 | first pivot direction |
| 92 | eyelet |
| 94 | threaded rod |
| 96 | variable tensioning device |
| 98 | opening |
| 100 | L-shaped bracket |
| 102 | wing nut |
| 104 | first abutment |
| 105 | transverse releasable locking device |
| 106 | overcenter clamp |
| 108 | handle |
| 110 | linkage |
| 112 | holder |
| 114 | threaded rod |
| 116 | second abutment |
| 128 | non-rotatable hold-down member |
| 130 | main body |
| 132 | arcuate cam surface |
| 132a | smaller radius portions |
| 132b | larger radius portions |
| 134 | vertical direction |
| 136 | pivot pin |
| 138 | adjustment device |
| 140 | lengthwise adjustment assembly |
| 142 | vertical adjustment assembly |
| 144 | guide track |
| 145 | tubular member |
| 147 | slot |
| 158 | guide rail |
| 162 | stop pin |
| 172 | lengthwise releasable locking device |
| 174 | releasable clamping device |
| 176 | bolt |
| 176a | bolt head |
| 177 | clamp |
| 178 | hole |
| 179 | handle |
| 181 | rods |
| 183 | guide block |
| 185 | slots |
| 188 | coil spring |
| 190 | pivot direction |
| 192 | eyelet |
| 194 | threaded rod |
| 196 | variable tensioning device |
| 198 | opening |
| 200 | L-shaped bracket |
| 202 | nut |
| 205 | vertical releasable locking device |
| 207 | releasable clamp |
| 209 | bolt |
| 209a | bolt head |
| 211 | clamp head |
| 213 | L-shaped bracket |

What is claimed is:

1. A combination workpiece positioning and antikickback device for a work table having a fence against which a workpiece is guided, comprising:
   a positioning member having a main body, and an arcuate cam surface at one edge of the main body for engaging a side surface of a workpiece on the work table;
   an adjustment device for moving the positioning member relative to the workpiece, the adjustment device including:
      a lengthwise adjustment assembly movable in a lengthwise direction of movement of the workpiece along the work table for adjusting the position of the positioning member in said lengthwise direction, and
      a transverse adjustment assembly movable in a direction transverse to said lengthwise direction for adjusting the position of the positioning member in the transverse direction, the transverse adjustment assembly being movably connected to the lengthwise adjustment assembly;
   a lengthwise releasable locking device for releasably locking the lengthwise adjustment assembly relative to the work table at a desired location in the lengthwise direction;
   a transverse releasable locking device for releasably locking the transverse adjustment assembly relative to the work table at a desired location in the transverse direction;
   a pivot which pivotally mounts the positioning member to the adjustment device for pivoting movement;
   a spring connected between the positioning member and the adjustment device for biasing the positioning member with a biasing force in a first pivot direction about said pivot such that said arcuate cam surface is biased in a direction opposite to a feed direction of said workpiece and into engagement with the side surface of the workpiece; and
   a variable tensioning device for variably adjusting the biasing force of the spring.

2. A combination workpiece positioning and antikickback device according to claim 1, wherein said main body is oriented substantially in said transverse direction, and said arcuate cam surface has a curvature with an increasing radius in a direction opposite to the direction of movement of said workpiece along the work table such that smaller radius portions of said arcuate cam surface extend closer toward the workpiece than larger radius portions of said arcuate cam surface.

3. A combination workpiece positioning and antikickback device according to claim 2, wherein said main body has an oblong shape.

4. A combination workpiece positioning and antikickback device according to claim 1, wherein said lengthwise adjustment assembly includes a first guide track extending in said lengthwise direction, and a guide rail movable in said guide track in said lengthwise direction, said pivot pivotally mounting the positioning member to the guide rail for pivoting movement.

5. A combination workpiece positioning and antikickback device according to claim 4, wherein said lengthwise adjustment assembly includes a second guide track extending in said lengthwise direction, said second guide track being collinear with said first guide track with a gap between said first and second guide tracks in which said positioning member is located.

6. A combination workpiece positioning and antikickback device according to claim 5, wherein said lengthwise releasable locking device includes a releasable clamping device for releasably clamping the guide rail to the first and second guide tracks at a desired location therealong.

7. A combination workpiece positioning and antikickback device according to claim 6, wherein each of said first and second guide tracks and said guide rail include teeth such that the teeth of said guide rail engage the teeth of said first and second guide tracks to prevent relative movement therebetween when the releasable clamping device releasably clamps the guide rail to the first and second guide tracks at a desired location therealong.

8. A combination workpiece positioning and antikickback device according to claim 5, wherein each said guide track includes at least one lengthwise groove therein, and said guide rail includes at least one lengthwise rod which slidably extends within each groove to prevent transverse movement of said guide rail relative to said guide tracks.

9. A combination workpiece positioning and antikickback device according to claim 5, wherein:
   said transverse adjustment assembly includes:
      a first abutment secured to said first guide track for engaging one transverse side of the work table; and
      a second abutment for engaging an opposite transverse side of the work table; and
   said transverse releasable locking device includes:
      a releasable clamp secured to said second guide track and said second abutment for moving said second abutment into releasable engagement with the opposite side of the work table; and
      a threaded rod which connects the second abutment to the releasable clamp with an adjustable distance therebetween.

10. A combination workpiece positioning and antikickback device according to claim 1, further comprising a stop on said lengthwise adjustment assembly for limiting pivotal movement of said positioning member.

11. A combination workpiece positioning and antikickback device according to claim 1, wherein said variable tensioning device includes a threaded tensioning rod connected between said spring and said lengthwise adjusting assembly, and threadedly connected with said lengthwise adjustment assembly for variably changing the biasing force of the spring.

12. A combination workpiece hold-down and antikickback device for a work table having a fence against which a workpiece is guided, comprising:
   a hold-down member having a main body, and an arcuate cam surface at one edge of the main body for engaging an upper surface of a workpiece on the work table;
   an adjustment device for moving the hold-down member relative to the workpiece, the adjustment device including:
      a lengthwise adjustment assembly movable in a lengthwise direction of movement of the workpiece along the work table for adjusting the position of the hold-down member in said lengthwise direction, and
      a vertical adjustment assembly movable in a vertical direction transverse to said lengthwise direction for adjusting the position of the hold-down member in the vertical direction, the vertical adjustment assembly being movably connected to the lengthwise adjustment assembly;
   a lengthwise releasable locking device for releasably locking the lengthwise adjustment assembly relative to the work table at a desired location in the lengthwise direction;
   a vertical releasable locking device for releasably locking the vertical adjustment assembly relative to the work table at a desired location in the vertical direction;
   a pivot which pivotally mounts the hold-down member to the adjustment device for pivoting movement;

a spring connected between the hold-down member and the adjustment device for biasing the hold-down member with a biasing force in a first pivot direction about said pivot such that said arcuate cam surface is biased in a direction opposite to a feed direction of said workpiece and into engagement with the upper surface of the workpiece; and a variable tensioning device for variably adjusting the biasing force of the spring.

13. A combination workpiece hold-down and anti-kickback device according to claim 12, wherein said main body is oriented substantially in said vertical direction, and said arcuate cam surface has a curvature with an increasing radius in a direction opposite to the direction of movement of said workpiece along the work table such that smaller radius portions of said arcuate cam surface extend closer toward the workpiece than larger radius portions of said arcuate cam surface.

14. A combination workpiece hold-down and anti-kickback device according to claim 13, wherein said main body has an oblong shape.

15. A combination workpiece hold-down and anti-kickback device according to claim 12, wherein said lengthwise adjustment assembly includes a guide track extending in said lengthwise direction, and a guide rail movable in said guide track in said lengthwise direction, with said vertical adjustment assembly mounted to said guide rail.

16. A combination workpiece hold-down and anti-kickback device according to claim 15, wherein said lengthwise releasable locking device includes a releasable clamping device for releasably clamping the guide rail to the guide track at a desired location therealong.

17. A combination workpiece hold-down and anti-kickback device according to claim 15, wherein said vertical adjustment assembly includes:
at least one vertically oriented rod extending from said guide rail; and
a guide block movably mounted along said at least one vertically oriented rod, said pivot pivotally mounting the hold-down member to the guide block for pivoting movement.

18. A combination workpiece hold-down and anti-kickback device according to claim 17, wherein said vertical releasable locking device includes a releasable clamp secured to said guide block for releasably engaging said at least one vertically oriented rod.

19. A combination workpiece hold-down and anti-kickback device according to claim 12, further comprising a stop on said vertical adjustment assembly for limiting pivotal movement of said hold-down member.

20. A combination workpiece hold-down and anti-kickback device according to claim 12, wherein said variable tensioning device includes a threaded tensioning rod connected between said spring and said vertical adjusting assembly, and threadedly connected with said vertical adjustment assembly for variably changing the biasing force of the spring.

21. A combination workpiece positioning, hold-down and anti-kickback device for a work table having a fence against which a workpiece is guided, comprising:
a first positioning member having a main body, and a first arcuate cam surface at one edge of the main body for engaging a side surface of a workpiece on the work table;
a first adjustment device for moving the first positioning member relative to the workpiece, the adjustment device including:
a first lengthwise adjustment assembly movable in a lengthwise direction of movement of the workpiece along the work table for adjusting the position of the positioning member in said lengthwise direction, and
a first transverse adjustment assembly movable in a direction transverse to said lengthwise direction for adjusting the position of the positioning member in the transverse direction, the transverse adjustment assembly being movably connected to the lengthwise adjustment assembly;
a first lengthwise releasable locking device for releasably locking the lengthwise adjustment assembly relative to the work table at a desired location in the lengthwise direction;
a first transverse releasable locking device for releasably locking the transverse adjustment assembly relative to the work table at a desired location in the transverse direction;
a first pivot which pivotally mounts the positioning member to the adjustment device for pivoting movement;
a first spring connected between the positioning member and the adjustment device for biasing the positioning member with a biasing force in a first pivot direction about said pivot such that said arcuate cam surface is biased in a direction opposite to a feed direction of said workpiece into engagement with the side surface of the workpiece;
a first variable tensioning device for variably adjusting the biasing force of the spring;
a hold-down member having a main body, and a second arcuate cam surface at one edge of the main body for engaging an upper surface of a workpiece on the work table;
a second adjustment device for moving the hold-down member relative to the workpiece, the second adjustment device including:
a second lengthwise adjustment assembly movable in said lengthwise direction for adjusting the position of the hold-down member in said lengthwise direction, and
a vertical adjustment assembly movable in a vertical direction transverse to said lengthwise direction for adjusting the position of the hold-down member in the vertical direction, the vertical adjustment assembly being movably connected to the lengthwise adjustment assembly;
a second lengthwise releasable locking device for releasably locking the second lengthwise adjustment assembly relative to the work table at a desired location in the lengthwise direction;
a vertical releasable locking device for releasably locking the vertical adjustment assembly relative to the work table at a desired location in the vertical direction;
a second pivot which pivotally mounts the hold-down member to the second adjustment device for pivoting movement;
a second spring connected between the hold-down member and the second adjustment device for biasing the hold-down member with a biasing force in a second pivot direction about said second pivot such that said second arcuate cam surface is biased in a direction opposite to the feed direction of said workpiece and into engagement with the upper surface of the workpiece; and
a second variable tensioning device for variably adjusting the biasing force of the second spring.

* * * * *